US012600928B2

(12) United States Patent
Delaney et al.

(10) Patent No.: US 12,600,928 B2
(45) **Date of Patent: *Apr. 14, 2026**

(54) PROCESS FOR TREATING A FABRIC AND RELATED COMPOSITIONS

(71) Applicant: The Procter & Gamble Company, Cincinnati, OH (US)

(72) Inventors: Sarah Ann Delaney, Hebron, KY (US); Sol Melissa Escobar, Mason, OH (US); Renae Dianna Fossum, Middletown, OH (US); Mark Robert Sivik, Mason, OH (US)

(73) Assignee: The Procter & Gamble Company, Cincinnati, OH (US)

(*) Notice: Subject to any disclaimer, the term of this patent is extended or adjusted under 35 U.S.C. 154(b) by 106 days.

This patent is subject to a terminal disclaimer.

(21) Appl. No.: 18/452,098

(22) Filed: Aug. 18, 2023

(65) Prior Publication Data

US 2023/0399592 A1 Dec. 14, 2023

Related U.S. Application Data

(63) Continuation of application No. 16/674,000, filed on Nov. 5, 2019, now Pat. No. 11,781,093.

(60) Provisional application No. 62/756,685, filed on Nov. 7, 2018.

(51) Int. Cl.

| | |
|---|---|
| ***C11D 7/26*** | (2006.01) |
| ***C11D 1/22*** | (2006.01) |
| ***C11D 1/72*** | (2006.01) |
| ***C11D 1/83*** | (2006.01) |
| ***C11D 3/00*** | (2006.01) |
| ***C11D 3/04*** | (2006.01) |
| ***C11D 3/20*** | (2006.01) |
| ***C11D 3/43*** | (2006.01) |
| ***C11D 7/32*** | (2006.01) |
| ***D06F 29/00*** | (2006.01) |
| ***D06F 35/00*** | (2006.01) |

(52) U.S. Cl.

CPC ................ *C11D 7/265* (2013.01); *C11D 1/83* (2013.01); *C11D 3/0015* (2013.01); *C11D 3/0021* (2013.01); *C11D 3/0068* (2013.01); *C11D 3/044* (2013.01); *C11D 3/2044* (2013.01); *C11D 3/2079* (2013.01); *C11D 3/2086* (2013.01); *C11D 3/43* (2013.01); *C11D 7/3245* (2013.01); *C11D 1/22* (2013.01); *C11D 1/72* (2013.01); *C11D 2111/12* (2024.01); *D06F 29/00* (2013.01); *D06F 35/006* (2013.01)

(58) Field of Classification Search

CPC ......... C11D 7/265; C11D 7/3245; C11D 1/22; C11D 1/72; C11D 1/83; C11D 2111/12; C11D 3/0015; C11D 3/0021; C11D 3/0068; C11D 3/044; C11D 3/2044; C11D 3/2079; C11D 3/2086; C11D 3/43

See application file for complete search history.

(56) References Cited

U.S. PATENT DOCUMENTS

| | | | |
|---|---|---|---|
| 3,812,042 | A | 5/1974 | Verdier |
| 4,828,750 | A | 5/1989 | Simion |
| 5,244,593 | A | 9/1993 | Roselle |
| 5,641,739 | A | 6/1997 | Kott |
| 5,935,921 | A | 8/1999 | Meunier |
| 6,262,003 | B1 | 7/2001 | Leonard |
| 6,361,768 | B1 | 3/2002 | Galleguillos |
| 6,756,350 | B1 | 6/2004 | Giblin et al. |
| 7,018,977 | B2 | 3/2006 | Martens |
| 7,026,278 | B2 | 4/2006 | Price |
| 7,695,523 | B2 | 4/2010 | Corradini |
| 11,072,768 | B2 | 7/2021 | Delaney et al. |
| 11,781,093 | B2 | 10/2023 | Delaney et al. |
| 2002/0111285 | A1 | 8/2002 | Price |
| 2005/0156141 | A1 | 7/2005 | Corradini |
| 2006/0111261 | A1 | 5/2006 | Sadlowski |
| 2007/0072785 | A1 | 3/2007 | Sahin et al. |
| 2007/0086971 | A1 | 4/2007 | Diet |
| 2007/0105744 | A1 | 5/2007 | Amiconi |
| 2008/0045431 | A1 | 2/2008 | Corradini |
| 2008/0287330 | A1 | 11/2008 | Corradini |
| 2010/0016206 | A1 | 1/2010 | Warkotsch et al. |
| 2011/0036374 | A1 | 2/2011 | Schneiderman et al. |
| 2011/0124545 | A1 | 5/2011 | Mort, III et al. |
| 2013/0111675 | A1 | 5/2013 | Soontravanich |
| 2014/0026331 | A1 | 1/2014 | Frankenbach |
| 2014/0349908 | A1 | 11/2014 | Delaney |
| 2014/0349914 | A1 | 11/2014 | Holder et al. |
| 2016/0024436 | A1 | 1/2016 | Vetter |
| 2016/0186096 | A1 | 6/2016 | Eberhardt |
| 2017/0198237 | A1 | 7/2017 | Shearouse et al. |
| 2017/0240845 | A1 | 8/2017 | Harris |
| 2018/0105769 | A1 | 4/2018 | Sieben et al. |
| 2018/0187129 | A1 | 7/2018 | Traistaru |

FOREIGN PATENT DOCUMENTS

| | | | |
|---|---|---|---|
| CN | 106029859 | A | 10/2016 |
| DE | 19923303 | A1 | 11/2000 |
| EP | 0090291 | A2 | 10/1983 |
| EP | 2853583 | A1 | 4/2015 |
| JP | H08337969 | A | 12/1996 |
| JP | 2017509806 | A | 4/2017 |
| KR | 20150100464 | A | 9/2015 |

(Continued)

OTHER PUBLICATIONS

All Office Actions: U.S. Appl. No. 18/452,106, filed Aug. 18, 2023.

(Continued)

*Primary Examiner* — Katie L. Hammer

(74) *Attorney, Agent, or Firm* — Carolyn S. Powell; Andrew J. Mueller

(57) ABSTRACT

Laundry additive compositions that include a metal sequestration agent and that may be characterized by an acidic pH. Related methods of treating a fabric, for example with a wash liquor and a rinse liquor, with such compositions and/or agents. Uses of such laundry additive compositions.

19 Claims, No Drawings

(56) References Cited

FOREIGN PATENT DOCUMENTS

| | | | |
|---|---|---|---|
| WO | 9218595 | A1 | 10/1992 |
| WO | 9604940 | A1 | 2/1996 |
| WO | 2008084460 | A1 | 7/2008 |
| WO | 2008111007 | A2 | 9/2008 |
| WO | 2011084577 | A1 | 7/2011 |
| WO | 2015130084 | A1 | 9/2015 |
| WO | 2015130085 | A1 | 9/2015 |
| WO | 2016058710 | A1 | 4/2016 |
| WO | 2018007201 | A1 | 1/2018 |
| WO | 2018056659 | A1 | 3/2018 |
| WO | 2018108517 | A1 | 6/2018 |

OTHER PUBLICATIONS

All Office Actions; U.S. Appl. No. 16/674,000, filed Nov. 5, 2019.

All Office Actions; U.S. Appl. No. 16/673,997, filed Nov. 5, 2019.

EPO Search Report and Opinion for Application No. 19207280.9; dated Apr. 14, 2020; 13 pages.

Gillette et al. "The White House Cookbook", online retrieved from "https://www.gutenberg.org/files/13923/13923-h/13923-h.htm", Jan. 28, 2021, 2 pages.

Jo Mantini, "Citric Acid: How to Make Your Softener and Dishwasher Rinse-Aid", online retrieved from https://thegreenboutique.co.uk/blogs/news/citric-acid-how-to-make-your-softener-and-dishwasher-rinse-aid, Jul. 5, 2019, 7 pages.

Melissa, "Plastic Reduction Mission 5: Fabric Softener Alternatives", online retrieved from "https://threehundredandsixtysix.wordpress.com/2015/02/09/plastic-reduction-mission-4-fabric-softener-alternatives/", Feb. 9, 2015, 10 pages.

Natalie Kay Smith, WikiHow—4 Ways to Restore Faded Clothes, Method 2, online retrieved from "https://www.wikihow.com/Restore-Faded-Clothes", Nov. 6, 2019, 5 pages.

Rachel, "Make your own fabric softener with natural ingredients", online retrieved from "https://www.whatagreenlife.com/make-your-own-fabric-softener-with-natural-ingredients/", Apr. 14, 2015, 4 pages.

Sodasan Peach Fabric Softener Bag in a Box—5L, online retrieved from "https://www.ethicalsuperstore.com/products/sodasan/sodasan-fabric-softener----5l/", No Known Date, 3 pages.

TGC042 kiyomi fabric softener, online retrieved from https://tangentgc.com/collections/frontpage/products/tgc042-kiyomi-fabric-softener, No Known Date, 5 pages.

Unpublished U.S. Appl. No. 18/452,106, filed Aug. 18, 2023, Sarah Ann Delaney et al.

Veronique Iorio, "10 DIY Ecological Detergents to keep your home (or bnb) naturally clean", online retrieved from "https://ecobnb.com/blog/2016/05/diy-ecological-detergents/", May 18, 2016, 18 pages.

Unpublished U.S. Appl. No. 19/027,010, filed Jan. 17, 2025, Sarah Ann Delaney et al.

PROCESS FOR TREATING A FABRIC AND RELATED COMPOSITIONS

FIELD OF THE INVENTION

The present disclosure relates to processes of treating a fabric, for example in the presence of a metal sequestration agent. The present disclosure further relates compositions that include such agents, and to uses related to such compositions.

BACKGROUND OF THE INVENTION

Laundry detergent compositions, which typically include surfactant, are known to provide benefits to fabrics through the wash cycle of an automatic washing machine. However, there is always a desire to improve performance.

Additionally, other laundry additive compositions, which may be substantially free of surfactant, are known to provide benefits to fabrics through the rinse cycle. However, many common compositions may not be desirable to consumers for various reasons. For example, fabric softeners are generally popular, but certain consumers may not wish for fabric softening actives to be deposited onto their fabrics. Some may use vinegar in the rinse, but the performance (and odor of the vinegar) may leave something to be desired. Products with natural ingredients, low viscosities, and/or transparent properties may also be desired.

Additionally, laundry compositions and treatment compositions that can provide multiple benefits are typically desirable.

Thus, there is a need for compositions and processes that provide improved performance, preferably along multiple benefit vectors, particularly through the rinse and/or in combination with a detergent composition or wash cycle.

SUMMARY OF THE INVENTION

The present disclosure relates to compositions and processes for treating fabrics, typically being characterized by relatively high levels of a metal sequestering agent and/or an acidic pH.

For example, the present disclosure relates to a method of treating a fabric, where the method includes the steps of: combining a liquid laundry additive composition with water to form a rinse liquor in a vessel, where the liquid laundry additive composition includes at least 12%, or at least 15%, preferably at least 18%, more preferably at least about 20%, by weight of the acidic rinse composition, of a metal sequestration agent, where the liquid laundry additive composition is characterized by a pH of from about 1 to about 6; contacting a fabric with the rinse liquor in the vessel and agitating the fabric; and removing the rinse liquor from the vessel. The process may further include a wash step, including contacting the fabric with a wash liquor, which may contain a source of anionic surfactant.

The present disclosure also relates to a method of treating a fabric, where the method includes the steps of: contacting a fabric with a wash liquor, the wash liquor including anionic surfactant; removing the wash liquor; contacting the fabric with a rinse liquor, the rinse liquor. including from about 150 to about 1500 ppm of a metal sequestration agent; and removing the rinse liquor.

The present disclosure also relates to a liquid laundry additive composition that includes: from about 12%, or from about 15%, or from about 18%, or from about 20%, or from about 22%, or from about 25%, to about 50%, or to about 45%, or to about 40%, or to about 35%, or to about 30%, or to about 28%, or to about 25%, by weight of the composition, of a metal sequestration agent; optionally perfume; from about 30%, or from about 40%, or from about 50%, to about 95%, or to about 90%, or to about 80%, or to about 75%, or to about 70%, by weight of the fabric composition, of water; the composition being characterized by an acidic pH.

The present disclosure also relates to various uses for the compositions described herein.

DETAILED DESCRIPTION OF THE INVENTION

The present disclosure relates to a process of treating a fabric, as well as related compositions and uses. The processes and compositions of the present disclosure may result in a variety of benefits to the target fabric, including softness, whiteness, stain removal, dye transfer inhibition, and/or malodor control benefits.

The process typically comprises a wash step and a rinse step, for example in an automatic washing machine. The fabric may be treated with an anionic surfactant during the wash step, and with a metal sequestration agent during the rinse step, preferably the metal being calcium. Although metal sequestration agents are known to be useful in laundry processes, the present processes and compositions use such agents at particular levels, at particular pHs, and in particular regimen combinations so as to provide surprising fabric care benefits. Without wishing to be bound by theory, it is believed that sequestering calcium and other sources of hardness to a high degree in a treatment liquor, such as a rinse liquor, facilitates the removal of residual surfactant and metals on the fabric, inhibits dye transfer, and can help remove certain stains, among other benefits. Additionally, the processes and compositions of the present disclosure may be particularly environmentally friendly, which is increasingly important to today's consumer.

The processes and compositions of the present disclosure are described in more detail below.

As used herein, the articles "a" and "an" when used in a claim, are understood to mean one or more of what is claimed or described. As used herein, the terms "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein the phrase "fabric care composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Process of Treating a Fabric

The present disclosure relates to a process of treating a fabric. The fabric may be treated in one or more treatment liquors, preferably one or more aqueous treatment liquors. As described below, the process may comprise the step of contacting the fabric with a rinse liquor, which may be subsequent to contacting the fabric with a wash liquor.

The process may occur in any vessel suitable for containing such treatment liquors and fabrics. The vessel may be a basin suitable for a manual treatment process, such as a wash tub in which the fabrics are treated by hand. More preferably, the vessel is part of an automatic washing machine, such as the drum of an automatic washing machine. The drum is sized and dimensioned to suitably receive the fabrics and water. The process may comprise the step of providing the fabric to the vessel, for example to a drum of an automatic washing machine. The automatic washing machine may be a top-loading washing machine or a front-loading washing machine.

The fabric may be any fabric or article comprising fabric suitable for being treated by a laundering process. Suitable fabrics may include garments, linens, and the like. The fabric may comprise any suitable material or fiber type, such as cotton, polycotton, or other fiber types. The fabric may comprise natural fibers.

The fabric may comprise an odorant prior to being treated. Thus, the processes of the present disclosure may include providing a fabric, where the fabric comprises an odorant. The odorant may be a residual odorant that remains from a previous use of the fabric.

The odorant may be perfume. The perfume may be derived from a fine fragrance that was applied directly to a fabric (e.g., a garment) or to a user/wearer of the fabric (e.g, a garment) that rubbed off onto the fabric. The perfume may be derived from a perfume that was part of a fabric treatment product, such as a detergent or fabric softener, previously used to treat the fabric.

The odorant may comprise aldehydic materials. Such materials are often present in perfumes used in fine fragrances and household products such as laundry products. It is believed that the compositions and processes of the present disclosure are surprisingly effective at removing aldehydic materials.

The odorant may be derived from body soil, for example sweat and/or sebum. The odorant derived from body soil may remain on the fabric from a previous use or wear. Without wishing to be bound by theory, it is believed that certain sequestration agents, in addition to sequestering calcium, may also effectively sequester copper ions, which may facilitate the decomposition of certain body soils into malodorous materials. Thus, by sequestering copper, for example with citric acid, the formation of malodorous materials is inhibited or reduced.

a. Wash Step

The process of the present disclosure may include a wash step.

The wash step may comprise providing a detergent composition. The detergent composition may be in any suitable form. For example, the detergent composition may be in the form of a liquid composition, a granular composition, a single-compartment pouch, a multi- compartment pouch, a dissolvable sheet, a pastille or bead, a fibrous article, a tablet, a bar, a flake, a dryer sheet, or a mixture thereof. The detergent composition can be selected from a liquid, solid, or combination thereof.

The detergent compositions herein may be in the form of gels or liquids, including heavy duty liquid (HDL) laundry detergents. The laundry detergent composition may have a viscosity less than about 200 cps, or less than about 100 cps. The compositions may have viscosities of from about 1 cps to about 200 cps, or froma bout 2 cps to about 150 cps, or from about 3 to about 100 cps, or from about 4 to about 75 cps, or from about 5 to about 50 cps. Viscosity is measured according to the Test Method provided below.

The process may include a step of combining a laundry detergent composition with water to form a wash liquor. The process may further comprise the step of contacting a fabric with the wash liquor, preferably in a vessel, such as a drum of an automatic washing machine. The process may include the step of agitating the mixture of the fabric and/or the wash liquor, for example by rotating the drum or a center agitation post of the machine.

Typically, the water is added to the vessel. The laundry detergent composition may be added directly, in neat form, to the water to form the wash liquor. The laundry detergent composition may be added via a dispensing drawer of an automatic washing machine. The laundry detergent may be added to the vessel prior to the water being added to the vessel. The laundry detergent may be contacted with the fabric, for example in a pretreatment step, prior to being combined with the water.

The laundry detergent may comprise from about 50% to about 95%, or from about 60% to about 90%, or from about 65% to about 81%, by weight of the composition, water. When the composition is in concentrated or unit dose form, the laundry detergent composition may comprise less than about 50% water, or less than about 30% water, or less than about 20% water, or less than about 15%, or less than about 10% water, or less than about 5% water.

The detergent compositions disclosed herein may contain from about 1%, or from about 5%, or from about 10%, or from about 20% or from about 30%, of from about 40% or from about 50%, to about 40%, or to about 50%, or to about 60% or to about 70% or to about 80% or to about 90%, or to about 100% by weight of renewable components.

The rinse liquor and/or laundry detergent may comprise surfactant. The process may include contacting the fabric with a wash liquor that includes surfactant, preferably anionic surfactant. The aqueous wash liquor may comprise from about 50 to about 5000 ppm, or from about 100 to about 1000 ppm, anionic surfactant. Suitable anionic surfactants are described below.

The laundry detergent may comprise from about 5%, or from about 10%, or from about 12%, or from about 15%, to about 60%, or to about 50%, or to about 40%, or to about 30%, or to about 25%, or to about 20%, by weight of the laundry detergent composition, of surfactant. Suitable surfactants may include anionic surfactants, nonionic surfactants, zwitterionic surfactants, amphoteric surfactants, cationic surfactants, or mixtures thereof.

The laundry detergent composition may comprise anionic surfactant. Anionic surfactants common in laundry products may include anionic sulphonate surfactants such as lincar alkyl benzene sulphonate (LAS), sulfated surfactants such as alkoxylated and/or non-alkoxylated sulfate surfactants, or mixtures thereof. Anionic surfactants may be linear and/or branched.

The laundry detergent composition may comprise other surfactants, such as nonionic surfactant (including nonionic ethoxylated fatty alcohols; the nonionic surfactant may be linear and/or branched), zwitterionic surfactant (such as amine oxide), and/or amphoteric surfactants (such as betaines).

The laundry detergent composition may be characterized by an acidic pH. The compositions may have a pH less than about 7, when measured in a neat solution of the composition at 20 +2° C. In some aspects, the pH of the composition is from about 2 to about 6.9, or from about 2 to about 6, or from about 2 to about 5, or from about 2.1 to about 4, or about 2.5.

In some aspects, the detergent compositions of the present invention have a reserve acidity to pH 7.00 of at least about 1, or at least about 3, or at least about 5. In some aspects, the compositions herein have a reserve acidity to pH 7.00 of from about 3 to about 10, or from about 4 to about 7. As used herein, “reserve acidity” refers to the grams of NaOH per 100 g of product required to attain a pH of 7.00. The reserve acidity measurement as used herein is based upon titration (at standard temperature and pressure) of a 1% product solution in distilled water to an end point of pH 7.00, using standardized NaOH solution. Without being limited by theory, the reserve acidity measurement is found to be the best measure of the acidifying power of a composition, or the ability of a composition to provide a target acidic wash pH when added at high dilution into tap water as opposed to pure or distilled water. The reserve acidity is controlled by the level of formulated organic acid along with the neat product pH as well as, in some aspects, other buffers, such as alkalizing agents, for example, alkanolamines.

The wash liquor may be characterized by an acidic pH. The wash liquor may be characterized by a pH of less than about 7. The pH of the wash liquor may be from about from about 2 to about 6.9, or from about 3 to about 6, or from about 3 to about 5, or 3.5 to about 4.5, or about 4.

The laundry detergent composition may further comprise at least one detergent adjunct, which may be present in the composition at levels suitable for the intended use of the composition. Typical usage levels range from as low as 0.001% by weight of composition for adjuncts such as optical brighteners to 50% or more by weight of the composition for carriers.

The at least one detergent adjunct may be selected from the group consisting of fatty acids and/or salts thereof, enzymes, encapsulated benefit agents, soil release polymers, hueing agents, builders, chelating agents, dye transfer inhibiting agents, dispersants, enzyme stabilizers, catalytic materials, bleaching agents, bleach catalysts, bleach activators, polymeric dispersing agents, soil removal/anti-redeposition agents, polymeric dispersing agents, polymeric grease cleaning agents, brighteners, suds suppressors, dyes, hueing agents, perfume, structure elasticizing agents, fabric softeners, carriers, fillers, hydrotropes, solvents, anti-microbial agents and/or preservatives, neutralizers and/or pH adjusting agents, processing aids, fillers, rheology modifiers or structurants, opacifiers, pearlescent agents, pigments, anti-corrosion and/or anti-tarnishing agents, and mixtures thereof. The at least one detergent adjunct may be at least one laundry adjunct selected from the group consisting of a structurant, a builder, a fabric softening agent, a polymer or an oligomer, an enzyme, an enzyme stabilizer, a bleach system, a brightener, a hueing agent, a chelating agent, a suds suppressor, a conditioning agent, a humectant, a perfume, a encapsulated perfume, a filler or carrier, an alkalinity system, a pH control system, a buffer, an alkanolamine, a solvent, and mixtures thereof.

The at least one detergent adjunct may comprise citric acid. Citric acid can act as a builder (e.g., a metal sequestration agent) and/or an acidifying agent. The laundry detergent composition may comprise from about 1%, or from about 2%, or from about 3%, or from about 5% or from about 10%, or from about 12%, to about 20%, or to about 18%, or to about 16%, or to about 15%, by weight of the laundry detergent composition, of citric acid. When fabrics are treated in a regimen (e.g., a wash cycle and a rinse cycle) with at least two compositions that comprise citric acid, the fabrics experience benefits associated with high levels of citric acid without the challenges that come from trying to package the same amount of citric acid into a single product (pH control, regulatory concerns, etc.). Thus, it may be preferred that the laundry detergent compositions and liquid laundry additive compositions of the present disclosure both comprise citric acid, preferably in relatively large quantities (e.g., each at least about 10% or more).

The process may include the step of removing the wash liquor from the vessel, for example by draining the wash liquor, which may be assisted by gravity and/or spinning the vessel. It is understood that not 100wt % of the wash liquor may be removed from the vessel. For example, residual wash liquor may be left in the vessel and/or remain absorbed by the fabric. The process may include removing at least 70wt %, or at least 80wt %, or at least 90wt %, by weight of the wash liquor, of the wash liquor from the vessel.

b. Rinse Step

The processes of the present disclosure may comprise a rinse step. The rinse step may occur during a rinse cycle of an automatic washing machine. A rinse step typically follows a washing step and may be intended to remove at least some of the benefit agents provided in a wash steps, such as surfactant. The rinse step may also help to remove soils that have been loosened during a rinse step but were not removed when the wash liquor was removed from the treatment vessel.

Furthermore, the rinse step can be used to provide additional benefit agents to the fabric. Traditionally, certain laundry products, such as liquid fabric softeners, have been added during a rinse step. However, certain consumers may not wish to use these traditional products on their fabrics, given that such products may deposit compounds such as softening active agents on the fabrics. Additionally, certain fabrics, such as certain synthetic fabrics, are not suitably treated with such products.

The processes of the present disclosure may provide treatment benefits to fabrics in a rinse step as an alternative to the use of a traditional rinse-added product, such as a liquid fabric softener. To note, although the present disclosure generally discusses the processes as being part of a "rinse step" that follows a "wash step," the processes of the present disclosure may include a rinse step without a preceding wash step. Thus, the rinse steps of the present disclosure may occur independently of a wash step, for example as a stand-alone treatment and/or soaking process. The rinse step of the present disclosure may even precede a wash step in a multi-step process.

The processes of the present disclosure may include contacting fabric with a rinse liquor, which may be an aqueous rinse liquor. The contacting may occur in a vessel, such as the drum of an automatic washing machine. When the rinse step follows a wash step, the rinse step may occur in the same vessel in which the wash step occurred.

The rinse liquor may comprise a metal sequestration agent. Without wishing to be bound by theory, it is believed that by treating a fabric with a rinse liquor comprising a relatively high level of a metal sequestration agent, the fabric may show improved softness, improved whiteness, improved stain removal, and/or improved malodor control/removal. By removal, sequestration, chelation, and/or dissociation of metals and minerals found in fabrics or even in the treatment liquor, soap scums and residues such as calcium stearates can be broken down, dissolved, removed, and even prevented from forming. Such residues and the accumulation thereof on fabrics have been associated to reduced softness via mineral deposition, reduced odor removal due to residue buildup, reduced whiteness via yellowing and residue oxidation, and decreased stain removal vial increased soil load on fabrics. Additionally, metal sequestration agents in combination with acidifying agents, or that are also acidifying agents (e.g., an organic acid), may be preferred, because agent in excess of the amount needed to treat/sequester the calcium may serve as a buffer of the composition and/or treatment liquor as well as a chelating agent, inhibiting excess liquor metal/mineral interactions with fabric dyes and pigments that may lead to bleeding of dyes, color fading, and/or other color changes.

The rinse liquor may comprise at least about 150 ppm of a metal sequestration agent. The rinse liquor may comprise from about 150 to about 1500 ppm, or from about 175 to about 1200 ppm, or from about 185 to about 1000 ppm, of a metal sequestration agent. When using a traditional top-loading machine, the levels may be relatively low, for example from about 150 to about 300ppm, due to the relatively large amount of water used. In low-water usage geographies, or when using a high-efficiency machine, the levels may be relatively higher, for example from about 400 to about 1200 ppm, or from about 500 to 1000 ppm.

A compound's affinity for particular metal ions can be described in terms of a binding constant, which are known and published for common compounds. The metal sequestration agent may have a binding constant (log K1) for calcium ions ($Ca^{2+}$) of at least about 2.5, or at least about 3.0, or at least about 3.5. Magnesium ion ($Mg^{2+}$) can also contribute to water hardness, and the metal sequestration agent may have a binding constant magnesium ions of at least about 2.0, or at least about 2.5. If not binding constants are not readily available from the literature, they may be determined measured at pH 8 according to conventional methods.

The metal sequestration agent may be an organic compound, such as an organic polycarboxylic acid and/or their salts. Suitable organic polycarboxylic acids may include:

citrates; gluconates; oxydisuccinates; glycerol mono-, di-, and/or trisuccinates; carboxymethyloxysuccinates; carboxymethyloxymalonates; dipicolinates; and hydroxyethyliminodiacetates. It may be that the metal sequestration agent is not a carbonate compound, a silicate compound, or an acrylate compound.

The metal sequestration agents may be naturally derived. Naturally derived metal sequestration agents may include: nitrilotriacetic acid; ethylenediaminetetraacetic acid; diethylenetriaminepentaacetic acid; glycine-N,N-diacetic acid; methylglycine-N,N diacetic acid; 2-hydroxyethyliminodiacetic acid; glutamic acid-N,N-diacetic acid; 3-hydroxy 2,2'-iminodisuccinate; S,S-ethylenediaminedisuccinate aspartic acid-diacetic acid; N,N' ethylenediamine disuccinic acid; iminodisuccinic acid; aspartic acid; aspartic acid-N,N 10 diacetate; beta-alaninediacetic acid; polyaspartic acid; octanohydroxamic acid; lysine hydroxamate; methionine hydroxamate; norvaline hydroxamate; citric acid; lactic acid; salts thereof; or mixtures thereof. The metal sequestration agent may be substantially biodegradeable for environmental/sustainability reasons. Biodegradeability may be determined by the Sturm Ready Biodegradeability Test.

Citric acid is the preferred metal sequestration agent for use in liquid laundry additive compositions of the present disclosure, for at least environmental, cost, sequestration efficiency, and/or acidification reasons.

The rinse liquor may be characterized by an acidic pH. The rinse liquor may be characterized by a pH of from about 2 to about 6.5, or from about 3 to about 6, or from about 4 to about 5. It is believed that the acidity of the rinse liquor contributes to the efficacy of the present processes because, without wishing to be bound by theory, dissociation, breakdown, and removal of residual metals, minerals, or soap scum residues such as calcium soaps require sufficient acidification and/or acid strength which cannot often be achieved by more pH neutral compositions. For example, the acidic environment may facilitate the breaking up of metal complexes, for example by pushing the reaction equilibrium to the ionized states, making the metals easier to remove and/or sequester.

The rinse liquor may comprise an additional source of acidity, for example an organic acid or an inorganic acid. It may be preferred that the additional source of acidity is a weak acid, as such acids may help to maintain a constant pH due to buffering capacity. Suitable organic acids may include acetic acid, lactic acid, adipic acid, aspartic acid, carboxymethyloxymalonic acid, carboxymethyloxysuccinic acid, glutaric acid, hydroxyethlyliminodiacetic acid, iminodiacetic acid, maleic acid, malic acid, malonic acid, oxydiacetic acid, oxydisuccinic acid, succinic acid, sulfamic acid, tartaric acid, tartaric-discuccinic acid, tartaric-monosuccinic acid, or mixtures thereof, preferably lactic acid, acetic acid, or mixtures thereof. Suitable inorganic acids may include hydrochloric acid.

The rinse liquor may be formed by combining a source of the metal sequestration agent with water. The water, prior to being combined with the source of the metal sequestration agent, may be characterized by a hardness of from about 2 to about 30 grains per gallon (gpg), or from about 5 to about 15 gpg. The water, prior to being combined with the source of the metal sequestration agent, may include from about 15 to about 200 ppm calcium, or from about 20 to about 175 ppm calcium, or from about 50 to about 100 ppm calcium. The water may include calcium and magnesium present in a weight ratio of from about 2:1 to about 5:1, or from about 3:1 to about 4:1.

The source of the metal sequestration agent may be a laundry additive composition, such as a liquid laundry additive composition as described in more detail below. The processes of the present disclosure may comprise the step of combining a laundry additive composition, such as a liquid laundry additive composition as described in more detail below, with water to form a rinse liquor in the vessel. The laundry additive composition may comprise at least about 12%, or at least about 15%, preferably at least 18%, more preferably at least about 20%, by weight of the acidic rinse composition, of a metal sequestration agent. The laundry additive composition may be characterized, prior to being combined with the water, by a pH of from about 1 to about 6. The laundry additive composition may be characterized as being substantially free of detersive surfactant (such as anionic, nonionic, amphoteric, and/or zwitterionic surfactants), bleaching systems (such as peroxide and/or hypohalite bleaches), and/or fabric softening actives ("FSAs") (such as quaternary ammonium ester compounds and/or silicones).

The laundry additive composition, for example a liquid laundry additive composition, may be provided to a dispenser prior to being provided to the vessel. The dispenser may be part of an automatic laundry machine. The dispenser may be the dispenser drawer of an automatic washing machine. The dispenser may be located in the center post of a (top-loading) machine. The dispenser may be characterized by a receiving volume of from about 25mL to about 150mL, more preferably from about 50mL to about 100mL. The process may comprise providing about 25g to about 150g, or from about 30g to about 100g, or from about 40g to about 75g of a liquid laundry additive composition to a dispenser of an automatic laundry machine.

Such dispensers are where rinse-added additives are commonly added, so that they can be provided to the drum of the washing machine at the proper time or during the proper cycle. However, because of the dispensers typically have limited receiving volume available, it can be challenging to provide a suitable amount of active materials to the fabric via such dispensers.

For example, vinegar may comprise 5wt % of acetic acid, meaning that a 50g dose (approximately 50mL) will provide only about 2.5g of acetic acid. However, an illustrative composition of the present disclosure that comprises 20% citric acid will deliver about 10g of citric acid in a 50mL dose. Thus, the liquid laundry additive compositions of the present disclosure, which typically contain relatively high levels of metal sequestration agent, are advantageous over traditional compositions.

The processes of the present disclosure may include contacting the fabric with the rinse liquor in the vessel. The process may comprise agitating said fabric in the presence of the rinse liquor, for example by rotating the vessel or a center post in an automatic washing machine.

The rinse liquor may include surfactant, such as anionic surfactant. It may be that no surfactant, such as anionic surfactant, is intentionally added during the rinse cycle, but that some surfactant, such as anionic surfactant, is residual surfactant on the fabric and/or carries over with residual wash liquor that becomes part of the rinse liquor. The residual surfactant may reside on the fabrics as the result of a previous treatment cycle, for example a wash cycle that immediately preceded the rinse cycle. The rinse liquor may comprise less than about 500 ppm, or less than about 250 ppm, or less than about 100 ppm, anionic surfactant. The rinse liquor may comprise at least about 5 ppm, or at least about 10, or at least about 20 ppm, anionic surfactant. It is believed that the low pH of the rinse liquor and/or the laundry additive composition may facilitate the removal of such surfactants, particularly in the presence of the metal sequestration agent. Also, the surfactant may help with removal of other soils and/or prevent redeposition of soils.

The rinse liquor may comprise fugitive dye. A fugitive dye is a dye or other colorant that is removed, is dispersed, or otherwise dislocates from a dyed fabric into a treatment liquor, such as a rinse liquor. The fugitive dye may then deposit onto the dyed fabric or a different fabric, thereby resulting in "graying" or other color/whiteness loss of that fabric. Fugitive dyes may be any dye suitable for coloring a fabric or textile. The fugitive dye may be a direct dye, a reactive dye, a disperse dye, an acid dye, a basic dye a vat or indigo dye, a sulfur dye, a derivative thereof, a hydrolyzed product thereof, or a combination thereof. The fugitive dye may carryover from a wash liquor or wash step. It is believed that sequestration of the calcium in the rinse liquor inhibits the deposition of fugitive dyes on the fabrics being treated.

The process may comprise removing the rinse liquor from the vessel. The process may include multiple rinse cycles, in which water is provided to the vessel and then removed. When the process comprises multiple rinse cycles, it may be that the liquid laundry additive composition is provided only during one rinse cycle.

c. Additional Steps

The process of the present disclosure may include additional steps. For example, the process may include a pretreatment step, wherein the fabric and/or a soil thereon is contacted with a composition, solvent, or liquor intended to provide a benefit, particularly a benefit upon subsequent treatment steps. For example, the fabric and/or soil may be contacted with a composition that comprises surfactant and/or a bleaching system. The composition provided in a pretreatment step may be in any suitable form, such as a liquid, a spray, a bar, or a stick (e.g., a gel stick). The composition may be pretreated with a solvent, such as water or an organic solvent. Pretreatment with a solvent may include spraying the solvent onto the fabric or soaking the fabric in the solvent. A composition may be dissolved or dispersed in water to form an aqueous pretreatment liquor, which may then be used to contact the fabric, for example as a spray or as a soaking solution. The liquor may comprise surfactant or bleach.

The process of the present disclosure may include a drying step. The drying step may occur in an automatic dryer machine. The drying step may occur in the ambient environment, for example via line drying or on a drying rack.

Liquid Laundry Additive Composition

The present composition relates to a liquid laundry additive composition. The compositions may be useful as a stand-alone treatment composition, or as part of a regimen of treatments steps, such as a wash step and a rinse step, and/or in combination with a pretreatment step, as described in more detail above.

The liquid laundry additive composition is a liquid. The liquid composition may be of relatively low viscosity, even similar to that of water. Consumers may desire such low-viscosity compositions due to an association with purity, natural-ness, and/or simplicity. The compositions may be characterized by a viscosity of from about 1 to about 200, or to about 150, or to about 100, or to about 75 cps, or to about 50 cps, or to about 30 cps, or to about 20 cps, or to about 15 cps, or to about 10 cps. As used herein, viscosity is determined by the method provided in the Test Methods section below.

The fabric treatment compositions of the present disclosure are acidic compositions. The fabric treatment compositions of the present disclosure may be characterized by a pH of less than 7, or less than about 6, or less than about 5, or less than about 4, or less than about 3. The fabric treatment compositions of the present disclosure may be characterized by a pH of from about 1, or from about 1.5, or from about 2, to about 6, or to about 5, or to about 4, or to about 3, or to about 2.5. The compositions may have a pH of from about 2 to about 3.

In addition to the organic acids described below, the compositions may comprise additional pH adjusting agents, such as buffer agents and/or neutralizing agents, such as caustic materials (e.g., NaOH).

The compositions of the present disclosure may be characterized by a Reserve Acidity measurement. Without being limited by theory, the Reserve Acidity measurement is found to be the best measure of the acidifying power of a composition, or the ability of a composition to provide a target acidic wash or rinse pH when added at high dilution into tap water as opposed to pure or distilled water. The Reserve Acidity may be controlled by the level of formulated organic acid along with the neat product pH as well as, in some aspects, other buffers. The compositions of the present disclosure may have a Reserve Acidity to pH 4.0, or even 4.00, of at least about 1, or at least about 3, or at least about 5. The compositions described may have a Reserve Acidity to pH 4.0 of from about 3 to about 10, or from about 4 to about 7. As used herein, "Reserve Acidity" refers to the grams of NaOH per 100 g of product required to attain a pH of 4.0, or even 4.00. The Reserve Acidity measurement as used herein is based upon titration (at standard temperature and pressure) of a 1% product solution in distilled water to an end point of pH 4.0, or even 4.00, using standardized NaOH solution.

The fabric treatment compositions of the present disclosure may be substantially transparent. Such compositions may signal purity and/or natural origins (and consequently, lack of synthetic ingredients) to the consumer. The compositions may be characterized by a percent transmittance (% T) of at least about 50%, or at least about 60%, or at least about 70%, or at least about 80%, or at least about 90%, or at least about 95% of light using a 1 centimeter cuvette, at a wavelength of 410-800 nanometers, or 570-690 nanometers, where the composition is substantially free of dyes. For purposes of this disclosure, as long as one wavelength in the visible light range has greater than 50% transmittance, it is considered to be substantially transparent/translucent.

The disclosed compositions may be isotropic at 22°° C. As used herein, "isotropic" means a clear mixture, having a % transmittance of greater than 50% at a wavelength of 570 nm measured via a standard 10 mm pathlength cuvette with a Beckman DU spectrophotometer, in the absence of dyes. The percent transmittance is determined according to the method provided in the Test Methods section below.

Alternatively, transparency of the composition may be measured as having an absorbency in the visible light wavelength (from about 410 to 800 nm) of less than 0.3, which is in turn equivalent to at least 50% transmittance using the cuvette and wavelengths noted above.

The liquid laundry additive composition may comprise a metal sequestration agent, typically at a relatively high level. The liquid laundry additive composition may comprise at least about 15%, or from about 18%, or from about 20%, or from about 22%, or from about 25%, to about 50%, or to about 45%, or to about 40%, or to about 35%, or to about 30%, or to about 28%, or to about 25%, by weight of the composition, of a metal sequestration agent. The liquid laundry additive composition may comprise at least about 15%, or at least about 18%, or at least about 20%, or at least about 22%, or at least about 25%, by weight of the composition, of a metal sequestration agent.

A compound's affinity for particular metal ions can be described in terms of a binding constant, which are known and published for common compounds. The metal sequestration agent may have a binding constant (log $K_1$) for calcium ions ($Ca^{2+}$) of at least about 2.5, or at least about 3.0, or at least about 3.5. Magnesium ion ($Mg^{2+}$) can also contribute to water hardness, and the metal sequestration agent may have a binding constant magnesium ions of at least about 2.0, or at least about 2.5.

The metal sequestration agent may be an organic compound, such as an organic polycarboxylic acid and/or their salts. Suitable organic polycarboxylic acids may include: citrates; gluconates; oxydisuccinates; glycerol mono-, di-, and/or trisuccinates;

carboxymethyloxysuccinates; carboxymethyloxymalonates; dipicolinates; and hydroxyethyliminodiacetates; preferably a citrate; more preferably citric acid. It may be that the metal sequestration agent is not a carbonate or a silicate compound.

The metal sequestration agents may be naturally derived. Naturally derived metal sequestration agents may include: nitrilotriacetic acid; ethylenediaminetetraacetic acid;

diethylenetriaminepentaacetic acid; glycine-N,N-diacetic acid; methylglycine-N,N diacetic acid; 2-hydroxyethyliminodiacetic acid; glutamic acid-N,N-diacetic acid; 3-hydroxy 2,2'-iminodisuccinate; S,S-ethylenediaminedisuccinate aspartic acid-diacetic acid; N,N' ethylenediamine disuccinic acid; iminodisuccinic acid; aspartic acid; aspartic acid-N,N 10 diacetate; beta-alaninediacetic acid; polyaspartic acid; octanohydroxamic acid; lysine hydroxamate; methionine hydroxamate; norvaline hydroxamate; citric acid; lactic acid; salts thereof; or mixtures thereof; preferably citric acid, lactic acid, or mixtures thereof, more preferably citric acid. The metal sequestration agent may be substantially biodegradeable for environmental/sustainability reasons. Biodegradeability may be determined by the Sturm Ready Biodegradeability Test.

Citric acid is the preferred metal sequestration agent for use in liquid laundry additive compositions of the present disclosure, for at least environmental, cost, sequestration efficiency reasons, and/or acidification capabilities.

The liquid laundry additive compositions of the present disclosure may contain an additional organic acid. Such acids may facilitate pH control and/or treatment benefits. The additional organic acid may be selected from acetic acid, lactic acid, adipic acid, aspartic acid, carboxymethyloxymalonic acid, carboxymethyloxysuccinic acid, glutaric acid, hydroxyethlyliminodiacetic acid, iminodiacetic acid, maleic acid, malic acid, malonic acid, oxydiacetic acid, oxydisuccinic acid, succinic acid, sulfamic acid, tartaric acid, tartaric- discuccinic acid, tartaric-monosuccinic acid, or mixtures thereof, preferably acetic acid.

Acetic acid may added to the composition, or present in the composition, in the form of vinegar. Thus, the compositions of the present disclosure may comprise acetic acid and/or vinegar. Acetic acid and/or vinegar may be preferred for traditional fabric care benefits associated with vinegar, including softness and/or cleaning. Acetic acid may be present at a level of from about 0.05%, or from about 0.1%, or from about 0.15%, or from about 0.2% to about 5%, or to about 3%, or to about 2%, or to about 1%, or to about 0.5%, or to about 0.3%, by weight of the composition. Vinegar may be present at a level of from about 0.5%, or from about 1%, or from about 1.5%, or from about 2%, to about 20%, or to about 15%, or to about 10%, or to about 5%, or to about 4%, or to about 3%, by weight of the composition.

The compositions of the present disclosure may include a biodegradcable metal sequestration agent, such as citric acid, in combination with acetic acid/vinegar, as such a combination provides sustainable ingredients that are perceived as natural or safe by many consumers. The biodegradeable metal sequestration agent, preferably citric acid, and acetic acid may be present in a weight ratio of from about 300:1, or from about 250:1, or from about 225:1, or from about 200:1, to about 1:1, or to about 10:1, or to about 50:1, or to about 100:1. It may be desirable to have relatively more of the metal sequestration agent (e.g., citric acid) compared to the acetic acid in order to improve performance while minimizing undesirable odor that is often associated with acetic acid/vinegar.

The compositions are typically aqueous compositions. Thus, the liquid laundry additive compositions may comprise water. The fabric treatment compositions of the present disclosure may comprise from about 30%, or from about 40%, or from about 50%, to about 95%, or to about 90%, or to about 80%, or to about 75%, or to about 70%, by weight of the fabric composition, of water.

Although the fabric treatment compositions of the present disclosure are aqueous, the compositions may further comprise organic solvent, which can improve composition stability, ingredient dissolution, and/or transparency of the composition. The fabric treatment compositions may include from about 0.1% to about 30%, or from about 1% to about 20%, by weight of the composition, of organic solvent. Suitable organic solvents may include ethanol, diethylene glycol (DEG), 2-methyl-1,3-propanediol (MPD), monopropylene glycol (MPG), dipropylene glycol (DPG), oligamines (e.g., diethylenetriamine (DETA), tetraethylenepentamine (TEPA)), glycerine, propoxylated glycerine, ethoxylated glycerine, ethanol, 1,2-propanediol (also referred to as propylene glycol), 1,3-propanediol, 2,3-butanediol, cellulosic ethanol, renewable propylene glycol, renewable monopropylene glycol, renewable dipropylene glycol, renewable 1,3-propanediol, and mixtures thereof. One or more of the organic solvents may be bio-based, meaning that they are derived from a natural/sustainable, non-geologically-derived (e.g., non-petroleum-based) source.

The liquid laundry additive compositions of the present disclosure may comprise perfume. Perfume may provide a signal to the user that a fabric treated with the composition is now clean. Perfume may also serve to mask undesirable odors of other components of the composition, such as acetic acid.

The liquid laundry additive compositions of the present disclosure may comprise a limited number of ingredients, for example, no more than ten, or no more than nine, or no more than eight, or no more than seven, or no more than six, or no more than five ingredients. Limiting the number of ingredients can result in lower storage and/or transportation costs of raw materials, and/or simplify the process of making the compositions. Consumers may also desire products having a limited number of ingredients, as they may be perceived as simpler, as having a smaller environmental footprint, and/or as providing an easier-to-understand ingredient list. The liquid laundry additive compositions of the present disclosure may consist essentially of, or even consist of, the desired components.

As described above, the present compositions may be relatively transparent. Therefore, the present composition may be substantially free of particles, such as encapsulated benefit agents, silicone droplets, pearlescent agents, and/or opacifiers, which may reduce the relative transparency of the composition. The present compositions may be substantially free of dyes. As used herein the term "dye" includes aesthetic dyes that modify the aesthetics of the cleaning composition as well as dyes and/or pigments that can deposit onto a fabric and alter the tint of the fabric. Dyes may include colorants, pigments, and hueing agents. The present compositions may be free of optical brighteners.

The present compositions may be substantially free of detersive surfactant (such as anionic, nonionic, amphoteric, and/or zwitterionic surfactants), bleaching systems (such as peroxide and/or hypohalite bleaches), and/or fabric softening actives ("FSAs", such as quaternary ammonium ester compounds and/or silicones). Such materials may affect the aesthetics, physical stability, and/or chemical stability of the other ingredients in the present compositions. Additionally or alternatively, certain such materials may not be physically or chemically stable themselves in low-pH environment of the present compositions. Furthermore, consumers who use the present compositions may be hoping to remove materials from their treated fabrics, whereas at least some of the listed materials may instead deposit on fabric during a normal treatment cycle, building up undesirable residues. Fabric softening actives may include quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, or combinations thereof. As used herein, the terms "fabric softening actives" is not intended to include any of the materials listed above as metal sequestration agents and/or additional organic acids, including vinegar or acetic acid.

In an effort to keep viscosity low, the compositions of the present disclosure may be substantially free of thickeners or other rheology enhancers, such as structurants. The compositions may be substantially free of salts, such as inorganic salts like sodium chloride, magnesium chloride, and/or calcium chloride, that can provide rheology modification such as thickening. As used herein, such salts are not intended to include the neutralization products of the organic acids described herein.

Packaging

The liquid laundry additive compositions described herein can be packaged in any suitable container, including those constructed from paper, cardboard, plastic materials, and any suitable laminates. The container may contain renewable and/or recyclable materials.

The composition may be contained in a transparent container, such as a transparent bottle. The bottle or container may have a transmittance of more than about 25%, or more than about 30%, or more than about 40%, or more than about 50% in the visible part of the spectrum (approx. 410-800 nm, preferably at 570nm). Alternatively, absorbency of the bottle may be measured as less than about 0.6 or by having transmittance greater than about 25%, where % transmittance equals:

$$\frac{1}{10^{absorbancy}} \times 100\%$$

For purposes of the disclosure, as long as one wavelength in the visible light range has greater than about 25% transmittance, it is considered to be transparent/translucent.

Clear bottle materials that may be used include, but are not limited to: polypropylene (PP), polyethylene (PE), polycarbonate (PC), polyamides (PA) and/or polyethylene terephthalate (PETE), polyvinylchloride (PVC); and polystyrene (PS). Recyclable materials may be preferred for environmental reasons.

The container or bottle may be of any form or size suitable for storing and packaging liquids for household use. For example, the container may have any size but usually the container will have a maximal capacity of about 0.05 to about 15 L, or about 0.1 to about 5 L, or from about 0.2 to about 2.5 L. The container may be suitable for easy handling. For example, the container may have handle or a part with such dimensions to allow easy lifting or carrying the container with one hand. The container may have a means suitable for pouring a liquid detergent composition and means for reclosing the container. The pouring means may be of any size or form. The closing means may be of any form or size (e.g., to be screwed or clicked on the container to close the container). The closing means may be cap, which can be detached from the container. Alternatively, the cap may be attached to the container, whether the container is open or closed. The closing means may also be incorporated in the container.

Uses

The present disclosure also relates to various uses of the compositions and/or ingredients described herein.

For example, the present disclosure relates to the use of a liquid laundry additive composition comprising at least 15%, by weight of the composition, of a metal sequestration agent, such as citric acid, to inhibit dye transfer for fabrics during a laundering process. The liquid laundry additive composition may be characterized by an acidic pH, for example by a pH of from about 1, or from about 1.5, or from about 2, to about 6, or to about 5, or to about 4, or to about 3, or to about 2.5.

The present disclosure also relates to the use of a liquid laundry additive composition comprising at least 15%, by weight of the composition, of a metal sequestration agent, such as citric acid, to improve whitening performance on fabrics during a laundering process. The liquid laundry additive composition may be characterized by an acidic pH, for example by a pH of from about 1, or from about 1.5, or from about 2, to about 6, or to about 5, or to about 4, or to about 3, or to about 2.5.

The present disclosure also relates to the use of a liquid laundry additive composition comprising at least 15%, by weight of the composition, of a metal sequestration agent, such as citric acid, to improve cleaning performance on fabrics during a laundering process. The liquid laundry additive composition may be characterized by an acidic pH, for example by a pH of from about 1, or from about 1.5, or from about 2, to about 6, or to about 5, or to about 4, or to about 3, or to about 2.5.

The present disclosure also relates to the use of a liquid laundry additive composition comprising at least 15%, by weight of the composition, of a metal sequestration agent, such as citric acid, to improve removal of odorants, preferably aldehydic compounds, from fabrics. The liquid laundry additive composition may be characterized by an acidic pH, for example by a pH of from about 1, or from about 1.5, or from about 2, to about 6, or to about 5, or to about 4, or to about 3, or to about 2.5.

The present disclosure also relates to the use of a liquid laundry additive composition comprising at least 15%, by weight of the composition, of a metal sequestration agent, such as citric acid, to improve control of malodors, preferably malodors derived from fatty acids, on fabrics. The liquid laundry additive composition may be characterized by an acidic pH, for example by a pH of from about 1, or from about 1.5, or from about 2, to about 6, or to about 5, or to about 4, or to about 3, or to about 2.5.

Liquid laundry additive compositions suitable for the above-mentioned uses may be characterized by any of the characteristics and/or comprise any of the ingredients as described in the present disclosure.

Combinations

Specifically contemplated combinations of the disclosure are herein described in the following lettered paragraphs. These combinations are intended to be illustrative in nature and are not intended to be limiting.

A. A method of treating a fabric, said method comprising the steps of: combining a liquid laundry additive composition with water to form a rinse liquor in a vessel, wherein the liquid laundry additive composition comprises at least 12%, or at least 15%, preferably at least 18%, more preferably at least about 20%, by weight of the acidic rinse composition, of a metal sequestration agent, wherein the liquid laundry additive composition is characterized by a pH of from about 1 to about 6; contacting a fabric with the rinse liquor in the vessel and agitating the fabric; and removing the rinse liquor from the vessel.

B. The method according to paragraph A, the method further comprising the steps of: combining a laundry detergent composition with water to form a wash liquor in the vessel, wherein the laundry detergent composition comprises anionic surfactant; contacting a fabric with the wash liquor in the vessel and agitating said fabric; and removing the wash liquor from the vessel.

C. The process according to any of paragraphs A or B, wherein the laundry detergent composition is a liquid laundry detergent that is characterized by an acidic pH.

D. The process according to any of paragraphs A-C, wherein the liquid laundry additive composition is characterized by a pH of from about 2 to about 5, or to about 4, or to about 3.

E. The process according to any of paragraphs A-D, wherein the metal sequestration agent is an organic polycarboxylic acid, preferably selected from: citrates; gluconates; oxydisuccinates; glycerol mono-, di-, and/or trisuccinates; carboxymethyloxysuccinates; carboxymethyloxymalonates; dipicolinates; and hydroxyethyliminodiacetates; more preferably a citrate; even more preferably citric acid.

F. The process according to any of paragraphs A-E, wherein the liquid laundry additive composition further comprises an additional organic acid, preferably selected from acetic acid, lactic acid, adipic acid, aspartic acid, carboxymethyloxymalonic acid, carboxymethyloxysuccinic acid, glutaric acid, hydroxyethlyliminodiacetic acid, iminodiacetic acid, maleic acid, malic acid, malonic acid, oxydiacetic acid, oxydisuccinic acid, succinic acid, sulfamic acid, tartaric acid, tartaric-discuccinic acid, tartaric-monosuccinic acid, or mixtures thereof, preferably acetic acid.

G. The process according to any of paragraphs A-F, wherein the liquid laundry additive composition further comprises vinegar.

H. The process according to any of paragraphs A-G, wherein the liquid laundry additive composition is substantially free of a fabric softening active ("FSA").

I. The process according to any of paragraphs A-H, wherein the liquid laundry additive composition further comprises from about 30%, or from about 40%, or from about 50%, to about 95%, or to about 90%, or to about 80%, or to about 75%, or to about 70%, by weight of the fabric composition, of water.

J. The process according to any of paragraphs A-I, wherein process further comprises the step of providing the liquid laundry additive composition to a dispenser prior to being provided to the vessel, wherein the vessel is the drum of an automatic washing machine, and wherein the dispenser is characterized by a receiving volume of from about 25mL to about 150mL, more preferably from about 50mL to about 100mL, preferably wherein the dispenser is a dispenser drawer of the washing machine or located in a center post of an automatic washing machine.

K. A method of treating a fabric, said method comprising the steps of: contacting a fabric with a wash liquor, the wash liquor comprising anionic surfactant; removing the wash liquor; contacting the fabric with a rinse liquor, the rinse liquor comprising from about 150 to about 1500 ppm of a metal sequestration agent; removing the rinse liquor.

L. A method according to paragraph K, wherein the rinse liquor comprises from about 175 to about 1200 ppm, or from about 185 to about 1000 ppm, of a metal sequestration agent.

M. A method according to any of paragraphs K-L, wherein the metal sequestration agent is an organic polycarboxylic acid, preferably selected from: citrates; gluconates; oxydisuccinates; glycerol mono-, di-, and/or trisuccinates; carboxymethyloxysuccinates; carboxymethyloxymalonates; dipicolinates; and hydroxyethyliminodiacetates; more preferably a citrate; even more preferably citric acid.

N. A method according to any of paragraphs K-M, wherein the rinse liquor is characterized by a pH of from about 2 to about 6.5, or from about 3 to about 6, or from about 4 to about 5.

O. A method according to any of paragraphs A-N, wherein the rinse liquor comprises a fugitive dye.

P. A liquid laundry additive composition comprising: from about 12%, or from about 15%, or from about 18%, or from about 20%, or from about 22%, or from about 25%, to about 50%, or to about 45%, or to about 40%, or to about 35%, or to about 30%, or to about 28%, or to about 25%, by weight of the composition, of a metal sequestration agent; optionally perfume; from about 30%, or from about 40%, or from about 50%, to about 95%, or to about 90%, or to about 80%, or to about 75%, or to about 70%, by weight of the fabric composition, of water; the composition being characterized by an acidic pH.

Q. The composition according to paragraph P, wherein the metal sequestration agent is selected from the group consisting of: nitrilotriacetic acid; ethylenediaminetetraacetic acid; diethylenetriaminepentaacetic acid; glycine-N,N-diacetic acid; methylglycine-N,N diacetic acid; 2-hydroxyethyliminodiacetic acid; glutamic acid-N,N-diacetic acid; 3-hydroxy 2,2'-iminodisuccinate; S,S-ethylenediaminedisuccinate aspartic acid-diacetic acid; N,N' ethylenediamine disuccinic acid; iminodisuccinic acid; aspartic acid; aspartic acid-N,N 10 diacetate; beta-alaninediacetic acid; polyaspartic acid; octanohydroxamic acid; lysine hydroxamate; methionine hydroxamate; norvaline hydroxamate; citric acid; lactic acid; salts thereof; or mixtures thereof; preferably citric acid, lactic acid, or mixtures thereof, more preferably citric acid.

R. The composition according to any of paragraphs P-Q, wherein the composition is characterized by a pH of from about 1, or from about 1.5, or from about 2, to about 6, or to about 5, or to about 4, or to about 3, or to about 2.5.

S. The composition according to any of paragraphs P-R, wherein the composition is characterized by a Reserve Acidity to pH 4.0 of at least about 1, or at least about 3, or at least about 5.

T. The composition according to any of paragraphs P-S, wherein the composition is characterized by a percent transmittance (% T) of at least about 50%, or at least about 60%, or at least about 70%, or at least about 80%, or at least about 90%, or at least about 95% of light using a 1 centimeter cuvette, at a wavelength of 410-800 nanometers, or 570-690 nanometers, where the composition is substantially free of dyes.

U. The composition according to any of paragraphs P-T, wherein the composition further comprises vinegar and/or acetic acid.

V. The composition according to any of paragraphs P-U, wherein the composition is contained in a transparent container having a transmittance of more than about 25%, or more than about 30%, or more than about 40%, or more than about 50% at a wavelength of from about 410nm to about 800nm.

W. A use of a liquid laundry additive composition (for example, according to any of those described in paragraphs A-V) comprising at least 15%, by weight of the composition, of a metal sequestration agent, the composition optionally characterized by an acidic pH, to provide at least one of the following benefits:

- to inhibit dye transfer on fabrics during a laundering process;
- to improve whitening performance on fabrics during a laundering process;
- to improve cleaning performance on fabrics during a laundering process;
- to improve removal of odorants, preferably aldehydic compounds, from fabrics; and/or
- to improve control of malodors, preferably malodors derived from fatty acids, on fabrics.

Test Methods

Determination of pH

Unless otherwise stated herein, the pH of the composition is defined as the neat pH of the composition at 20 +2° C. Any meter capable of measuring pH to +0.01 pH units is suitable. Orion meters (Thermo Scientific, Clintinpark-Keppekouter, Ninovesteenweg 198, 9320 Erembodegem-Aalst, Belgium) or equivalent are acceptable instruments. The pH meter should be equipped with a suitable glass electrode with calomel or silver/silver chloride reference. An example includes Mettler DB 115. The electrode should be stored in the manufacturer's recommended electrolyte solution. The pH is measured according to the standard procedure of the pH meter manufacturer. Furthermore, the manufacturer's instructions to set up and calibrate the pH assembly should be followed.

Determination of Viscosity

The viscosity of a composition is determined by rotational viscometry using a Brookfield viscometer and the ASTM D 2196-99 at 60 RPM and 22° C.

Transmittance (% T)

As a measurement of the relative transparency/translucency of a composition, the percent transmittance (% T) of the composition may be determined.

Prior to measuring percent transmittance, vigorously shake a jar containing the composition for 10 seconds. Immediately place a sample into a 1-cm cuvette. Vigorously shake the sample in the cuvette for 10 seconds. Wait 30 seconds and measure the percent transmittance.

The percent transmittance of a composition is measured at the desired wavelength a standard 10 mm pathlength cuvette with a Beckman DU spectrophotometer, in the absence of dyes.

Fabric Preparation for Dye Transfer Tests

Before testing for dye transfer, the test fabrics are typically washed one time with detergent (e.g., for dye transfer tests), "de-sized" and/or "stripped" to remove any manufacturer's finish that may be present, and/or pre-conditioned with soil (e.g., for whiteness tests) according to A (below). Fabrics are dried, and then treated with a detergent composition in a mini-washing machine that is designed to mimic full-scale washing machine conditions according to B and C (below). The mini-washer uses a stainless steel cylinder spray-coated with porcelain spraying kit typically used on bathtubs (25 cm diameter by 22 cm height) that is fitted with a staggered level, 5-vane paddle with controllable settings for fill, wash/rinse times, and spin-speeds.

A. Stripping of fabrics. New fabrics are stripped by washing two times in a tradition top-loading washing machine such as a Kenmore 600 at 60° C. (140° F.) using 17 gallons of 0 gpg water. The first and second wash cycles use 59 mL of detergent (made according to AATCC 2003 Standard Reference Liquid Detergent without optical brightener), which is added to a 5.5-6 pound load of fabric. The wash cycle is followed by a rinses, and the second wash cycle is followed by three additional wash cycles without detergent or until no suds are observed. The fabrics are then dried in a tumble dryer until completely dry and used in the fabric treatment/test method.

B. Dye Transfer Fabric Treatment Method in a Mini-Washing Machine. Pre-washed fabrics are treated with a detergent composition in the presence of dye bleeder fabrics using a Mini-washing Machine. For the Mid-Scale Dye Control method, the mini-washer is filled to a 5.7L fill volume and is programmed for a 60-minute wash cycle, and a 20-minute rinse cycle with an agitation speed of 75 strokes per minute using 15 gpg/50°° C. (122° F.) water for the wash and 15 gpg/38°° C. (100° F.) water for the rinse. The detergent composition (30g, unless otherwise indicated) is added to the washing pot after the water is filled, agitated for 30s, then Reactive Brown 7 dye bleeder fabrics (7 swatches of STC SWT136 each measuring 7" x 11" obtained from Test Fabrics, West Pittston, PA) are added to the machine and agitated for 60s, and then pre-washed dye acceptor fabrics and ballast are added. The acceptor fabrics (120g) are two white t-shirts (100% cotton, Gildan, Toddler size 2T), with test fabric swatches (9.5 cm x 9.5 cm) sewn onto the shirt. Test fabrics may include 80/20 nylon/spandex #19505 and 98/2 cotton/spandex #19506 (available from WfK Testgewebe GmbH, Brüggen, Germany), Multi-Fiber Fabric #49, and/or acrylic #871 (available from Test Fabrics, W. Pittston, PA). Ballast fabrics (three white 100% cotton, white Gildan t-shirts, Toddler size 2T and two 50/50 cotton/polyester, white Gildan t-shirts Youth, size XS) are added for a total fabric weight of 350 +15g. Once the detergent, and all test fabrics are added to the mini-washer, the timed cycle begins. After the washing cycle is complete, the dye bleeder fabrics are removed, and the acceptor fabrics and ballast are dried in an automatic tumble dryer on low for 45 min (Kenmore dryer series), or until dry. Test fabrics are de-linted using a lint roller to remove any fuzz that could interfere with the spectrophotometer measurement.

Dye Transfer Measurement Method on treated Fabrics

As used herein and as will be familiar one of ordinary skill, the "L*C*h color space" and "L*a*b* color space" are three dimensional colorimetric models developed by Hunter Associates Laboratory and recommended by the Commission Internationale d'Eclairage ("CIE") to measure the color or change in color of a dyed article. The CIE L*a*b* color space ("CIELAB") has a scale with three-fold axes with the L axis representing the lightness of the color space (L*=0 for black, L*=100 for white), the a* axis representing color space from red to green (a*>0 for red, a*<0 for green) and the b* axis representing color space from yellow to blue (b*>0 for yellow, b*<0 for blue). The L*C*h color space is an approximately uniform scale with a polar color space. The CIE L*C*h color space ("CIELCh") scale values are determined instrumentally and may also be calculated from the CIELAB scale values. Term definitions and equation derivations are available from Hunter Associates Laboratory, Inc. and from www.hunterlab.com, and are incorporated in their entirety by reference herein.

The amount of dye transfer onto the acceptor fabrics can be described, for example, in terms of the change in L*C*h before and after treatment of the fabric as measured via spectrophotometry (for example, via a Spectrophotomer CM-3610d, manufactured by Konica Minolta, Tokyo, Japan) and is reported as dE2000 value. As used herein, the dE2000 value includes the vector associated with the distance in the L*C*h space between the initial L*C*h value and the final L*C*h value and corrected for perception according to the procedure detailed in G. Sharma, et al, in "The CIE dE2000 Colour Difference Formula: Implementation Notes, Supplementary test Data and Mathematical Observations," Color Research and Application, Vol 30 (1), 2005, p 21-30. Test fabrics are folded in half to double the thickness before measuring, except for test fabrics that are sewn onto the t-shirt, which are measured against the backing of the t-shirt. An average of two L*a*b* measures are taken per test fabric, and two fabrics are measured per example.

Relatively higher dE2000 values correspond to a greater color change, indicating that relatively more dye transferred to the fabric in question.

Whiteness Index

As used herein and as will be familiar one of ordinary skill, the "L*a*b* color space" are three dimensional colorimetric models developed by Hunter Associates Laboratory and recommended by the Commission Internationale d'Eclairage ("CIE") to measure the color or change in color of a dyed article. The CIE L*a*b* color space ("CIELAB") has a scale with three-fold axes with the L axis representing the lightness of the color space (L*=0 for black, L*=100 for white), the a* axis representing color space from red to green (a*>0 for red, a*<0 for green) and the b* axis representing color space from yellow to blue (b*>0 for yellow, b*<0 for blue). Term definitions and equation derivations are available from Hunter Associates Laboratory, Inc. and from www.hunterlab.com, and are incorporated in their entirety by reference herein.

The amount of dinge removal on white fabrics can be described, for example, in terms of the change in Whiteness Index (dWI) which is derived from CIE L*a*b* before and after the wash treatment of the fabric as measured via spectrophotometry (for example, via a DU 800 Spectrophotomer, manufactured by Hunter Laboratories, USA) and is reported as a dWI value. As used herein, the dWI value includes the vector associated with the distance in the Whiteness Index space (derived via the CIE L*a*b* space between the initial L*a*b* value and the final L*a*b* value). An average of two dWI measures are taken per test t-shirt square, and two squares are measured per treatment in each Dinge Level.

Relatively higher dWI values correspond to a greater Whiteness recovery, indicating that relatively more dinge was removed for the fabric in question.

Stain Removal

Stain Removal testing is conducted in Front Loader HE machines, in line with the guidance provided by ASTM4265-14 Standard Guide for Evaluating Stain Removal Performance in Home Laundering. Technical stain swatches of cotton CW120 containing 22 stains were purchased. The stained swatches were washed in conventional North American washing machines (Whirlpool®) using 7 grains per gallon hardness, selecting the normal cycle at 86F, using each of the respective detergent compositions listed in the table below. Image analysis was used to compare each stain to an unstained fabric control. Software converted images taken into standard colorimetric values and compared these to standards based on the commonly used Macbeth Colour Rendition Chart, assigning each stain a colorimetric value (Stain Level). Eight replicates of each were prepared. The stain removal index was then calculated according to the formula shown below.

Stain removal from the swatches was measured as follows:

$$\text{Stain Removal Index } (SRI) = \frac{\Delta E_{initial} - \Delta E_{washed}}{\Delta E_{initial}} \times 100$$

$$\Delta E_{initial} = \text{Stain level before washing}$$

$$\Delta E_{washed} = \text{Stain level after washing}$$

EXAMPLES

The examples provided below are intended to be illustrative in nature and are not intended to be limiting.

Example 1. Illustrative Compositions

Table 1 shows liquid laundry additive compositions (sometimes called "rinse additives") according to present disclosure. Amounts provided are by active wt %.

TABLE 1

| MATERIAL | 1A | 1B | 1C | 1D |
|---|---|---|---|---|
| Citric Acid | 23.7% | 12.5% | 23.7% | 23.7% |
| Vinegar (6% acetic Acid) | 2.6% | 1.3% | 5.0% | 5.0% |
| Sodium Hydroxide | 2.0% | 1.0% | 2.3% | 3.0% |
| 1,2 propanediol | 5.0% | 2.5% | 5.0% | 5.0% |
| Perfume | 0%-1.0% | 0%-1.0% | 0%-1.0% | 0%-1.0% |
| Deionized Water | Balance | Balance | Balance | Balance |

TABLE 1-continued

| PROPERTIES | | | | |
|---|---|---|---|---|
| Neat pH | about 2.5 | 2.5 | 2.5 | 3.5 |
| Reserve Acidity to pH = 4 | 3.0 | 3.0 | 3.0 | 3.0 |
| Viscosity (cp) (60 RPM, 22° C.) | Less than 10 cp | Less than 10 cp | Less than 10 cp | Less than 10 cp |

Example 2. Effect of Rinse Product on Water Hardness and pH

To test the effect of compositions according to the present disclosure on the water hardness and pH of a rinse liquor following a wash cycle with an acidic liquid laundry detergent, the following test is performed.

Three separate treatment cycles, each comprising a wash cycle with detergent and a rinse cycle, optionally with a rinse-added product, are run. The wash water pH is measured using a pH meter (Thermo Orion 261S 0067533/02 Calibrated upon use using a standard pH 4, 7 and 10 buffer solutions), and hardness is measured using test strips (Sofchek water quality test strips, HACH Company, Loveland, CO) after 55 min of washing. The rinse water pH and hardness is measured after 15 min of agitation in the rinse cycle. For each measurement, a 40 mL water aliquot is removed and pH is measured; then hardness is measured by dipping a test strip in water for 1 s, shaking off excess water, waiting for 15 s, and determining the hardness according to the color scale printed on the package.

The detergent product tested is a low-pH liquid heavy duty detergent (HDL) product according to the formulation provided in Table 2-1. The detergent product is characterized by a pH of about 2.5.

TABLE 2-1

| Detergent Ingredient | Wt % (active) |
|---|---|
| Anionic surfactant (C11.8 HLAS) | 6.8 |
| Nonionic surfactant (C12-14 EO9) | 10.8 |
| Citric acid | 14.0 |
| Organic solvent | 3.0 |
| Caustic | 1.0 |
| Acetic acid (added as vinegar) | 0.1 |
| Perfume | 1.0 |
| Water | Balance |

The same detergent is used in all three examples. Example 2A does not use a rinse-added product, Example 2B uses vinegar (about 6% acetic acid), and Example 2C uses a liquid laundry additive product according to the present disclosure, namely a composition according to Example 1A found in Table 1, above. Examples 2A and 2B are comparative; Example 2C includes compositions and processes according to the present disclosure.

Table 2-2 shows the hardness and pH results. The total amount (in mL) of organic acid that is delivered in the entire treatment cycle (detergent +rinse composition) is provided.

TABLE 2-2

| Example | Detergent Composition Dose | Rinse Composition (Dose) | Total Acid | Wash (5 minutes before the end) Hardness | Wash pH | Rinse Hardness | Rinse pH |
|---|---|---|---|---|---|---|---|
| 2A (comp.) | 16.72 mL | none | 2.33 mL | 3 | 4.9 | 15 | 7.9 |
| 2B (comp.) | 16.72 mL | Vinegar (37.85 mL) | 4.59 mL | 3 | 5.0 | 15 | 5.1 |
| 2C (inv.) | 16.72 mL | 1A (16.72 mL) | 6.23 mL | 3 | 4.9 | 3 | 4.3 |

As shown in Table 2-2, the detergent composition controls the hardness of the water reasonably well, believed to be due to the relatively high level of citric acid. Vinegar, however, does very little to hardness in the rinse, as shown by the same hardness levels in Examples 2A and 2B; that being said, the rinse pH does drop comparatively in Example 2B. Example 2C, however, controls hardness in the rinse and drops the pH even further compared to Examples 2A and 2B. In part, the composition delivers more acid per dose, and it also includes citric acid instead of acetic acid (component of vinegar).

Example 3. Dye Control

Example 3 shows the effect that the liquid laundry additive compositions of the present disclsoure can have on dye control performance. In general, it is believed that adding citric acid to the rinse water chelates hardness ions that decreases the amount of the hardness ions that bind to the fugitive dye molecules. It is believed that this results in more dye remaining solubilized in the rinse liquor and less fugitive dye deposition onto the white, acceptor fabrics.

Fabrics (white acceptor fabrics) are prepared and tested for dye transfer as provided for in the Test Methods Section. The midscale dye transfer method is used to assess the amount of dye that has been transferred from Reactive Brown 7 bleeder fabrics onto the cotton T-shirt, cotton knit, and cotton/spandex acceptor fabric after one treatment cycle (wash +rinse). In assessing the colors, no ultraviolet light is used.

The fabrics are given one of three treatments. The same acidic detergent is used in all three examples; the detergent formula is provided in Table 2-1 above. Example 3A does not use a rinse-added product, Example 3B uses vinegar (about 6% acetic acid), and Example 3C uses a liquid laundry additive product according to the present disclosure, namely a composition according to Example 1A found in Table 1, above. Examples 3A and 3B are comparative; Example 3C includes compositions and processes according to the present disclosure. Results regarding the color change of white acceptor fabrics are provided below in Table 3. Relatively greater dE2000 values indicates a color change, likely from fugitive dyes transfering onto the white acceptor fabrics. Relatively smaller dE2000 values indicate that the fabric suffered less of a color change, and likely less dye transfer.

TABLE 3

| Example | Detergent Composition Dose | Rinse Composition (Dose) | Total Acid | dE2000 (vs initial) Cotton t-shirt | Cotton Knit | Cotton/Spandex |
|---|---|---|---|---|---|---|
| 3A (comp.) | 16.72 mL | none | 2.33 mL | 4.2 | 5.9 | 4.1 |
| 3B (comp.) | 16.72 mL | Vinegar (37.85 mL) | 4.59 mL | 4.0 | 5.5 | 3.7 |
| 3C (inv.) | 16.72 mL | 1A (16.72 mL) | 6.23 mL | 3.4 | 5.0 | 3.5 |

As can be seen from results in Table 1, the addition of a liquid laundry additive composition according to the present disclosure to the rinse water reduced the dE2000 on fabric, indicating improved performance with regard to dye control. The dE2000 reduction is larger with the citric-acid-based product compared to straight vinegar, indicating improved performance of citric acid versus vinegar comparing example 3B to 3C.

Example 4. Odorant Removal

Example 4 shows the impact that the addition of a liquid laundry additive composition according to the present disclosure in combination with a low-pH detergent composition has on removing and stripping certain perfume materials from the surface of fabrics. Without wishing to be bound by theory, it is believed that addition of an acidic composition, which may comprise citric acid, in the rinse process enhances the removal of perfume raw materials, notably among them aldehydes, which in the presence of excess acid by shift into their hydrate unstable states, making them easier to remove.

Methodology.

100% Euro-Touch Cotton Terries were stripped with AATCC detergent at 120° F. wash and a hardness of 0 grains per gallon to remove any manufacturer finishes. Terries were then pre-treated with either personal fragrances (perfume/cologne) or fragranced Detergents and/or Fabric Conditioners with the purpose of infusing the respective scents in a consumer-relevant manner. The selection of personal/fine fragrances, detergents, and fabric conditioners were based on leading market share in the respective categories.

Fine Fragrance Application: Terries were hung with clips on a clothesline in an environment with Median North American conditions (77F temperature and 50% Relative Humidity). Each fragrance bottle was held consistently 4 inches from the Terry, making sure to aim the atomizer at the center, with only one full pump being sprayed. Each fragrance was tested for consistency in spraying yielding the results in the table below. Fabrics were then allowed to rest hanging for 1 hour prior to washing. The fine fragrances tested are: Coco Chanel Mademoiselle™ Eau de Parfum; J'Adore Dior™ Eau de Parfum; Hugo Boss™ Eau de Parfum; and Agua Di Gio™.

Detergent/Fabric Conditioner Application: Terries were treated in conventional North American washing machines (Whirlpool®) using 7 grains per gallon hardness, selecting the normal cycle at 86F, using each of the respective detergent fabric treatment compositions listed in the table below. The products used to treat the terries are: Tide™ Original Liquid Detergent;

Arm & Hammer™M Clean Burst Liquid Detergent; Downy™M April Fresh Liquid Fabric Conditioner; and Snuggle™M Blue Sparkle Liquid Fabric Conditioner.

Once pre-treated via washing or consistent spraying, six terries were placed into North American (Whirlpool®) washing machines to then be washed with one of the recovery treatments on the table below to account for terry-to-terry variability. Conditions used for this recovery step were 7 grains per gallon hardness, 86° F. wash temperature, and the normal cycle setting. The low-pH detergent is according to Table 2-1, above, and the liquid laundry additive is according to Example 1A found in Table 1, above. The treatment legs are provided in Table 4-1.

TABLE 4-1

| Treatments | | |
|---|---|---|
| TREATMENT | DOSAGE | TOTAL CITRIC ACID LEVEL (50% ACTIVE) |
| Control—no laundry compositions added | 0 | 0 |
| Low-pH Detergent (wash) | 53 mL detergent | 7.35 mL |
| Low-pH Detergent (wash) + Liquid Laundry Additive (rinse) | 53 mL detergent + 53 mL additive | 3.8 mL + 12.4 mL = about 16.2 mL |

After treatment, terries were dried for 35 minutes in North American Maytag® dryers. The center 4 in×4inch area of the terry, was then cut out and placed under Gas Chromatography and Mass Spectrometry (GC/MS) for headspace extractions. Once headspace extractions were gathered, these were screened and measured for the presence and level of over 200 commonly known perfume raw materials. These were then assessed for directional and statistical reductions in perfume materials across the different treatments, with lower levels indicating better cleansing/removal of perfume residues.

Results.

Upon analysis of the many perfume raw materials, it was found that certain perfume materials were removed by the control treatment (e.g., no laundry compositions added; only water). These perfume materials were screened out.

The perfume material level averages of the remaining/residual perfume materials were assessed. Based on these results, it was observed that the wash-and-rinse regimen (detergent product and additive product) removed several Aldehydes both statistically and directionally more than the detergent product did alone. A summary of these results are shown in Table 4-2. The letters next to the perfume materials indicate which materials are present in which product.

TABLE 4-2

Average Gas Chromatography/Mass Spectrometry headspace levels across fragrances, for certain residual perfume materials not removed by water

| Perfume Material | 4A Regimen (Detergent + Liquid laundry additive) (Average % Removal) | 4B Detergent only (Average % Removal) |
|---|---|---|
| Undecyl Aldehyde$^{ABCD}$ | 52.89* | −9.60 |
| Nonyl Aldehyde$^{ABCDG}$ | 59.81* | 33.60 |
| Decyl Aldehyde$^{ABCDF}$ | 67.51* | 24.03 |
| Jasmal$^{CD}$ | 97.51* | 93.03 |
| Ionone Beta $^{ABCDH}$ | 85.58* | 74.68 |
| Benzaldehyde$^{BCDEGH}$ | 82.54 | 71.65 |
| Octylaldehyde$^{ABCD}$ | 62.56 | 44.62 |
| Hexyl Cinnamic Aldehyde$^{ABCDGH}$ | 87.01 | 90.29 |
| Ethyl Linalool$^{ACDEFGH}$ | 99.84 | 96.14 |
| Hexyl Salicylate$^{ABCDGH}$ | 92.96 | 87.96 |
| Ionone Gamma Methyl$^{ABDCEFG}$ | 97.71 | 94.15 |

*indicates statistically lower levels present
$^{A}$indicates present in Tide™ Original Liquid Detergent
$^{B}$indicates present in Arm & Hammer™ Liquid Detergent
$^{C}$indicates present in Downy™ April Fresh Fabric Conditioner
$^{D}$indicates present in Snuggle™ Blue Sparkle Fabric Conditioner
$^{E}$indicates present in Hugo Boss™ Cologne
$^{F}$indicates present in Agua Di Gio™ Cologne
$^{G}$indicates present in J'adore Dior™ Perfume
$^{H}$indicates present in Chanel™ Mademoiselle Perfume Example 5. Stain Removal (1)-Regimen With Low pH Detergent Example 5 demonstrates the ability of adding an additive composition according to the present disclosure in the rinse to enable superior stain cleaning versus Low pH (citric based) detergent alone. It is believed that as excess acid is added into the treatment cycle, the ability of citric acid to act as a builder scavenging metals in the rinse enables stain removal of metal- sensitive stains to continue beyond the wash part of the cycle.

In order to assess the impact of the detergent product alone versus a regimen of the detergent and the additive composition, 53 mL of a low-pH Detergent (wash cycle) versus 53 mL of the low-pH Detergent (wash cycle) and 53 mL of the additive composition (rinse cycle) was added through the treatment cycle. The low-pH detergent is according to Table 2-1, above, and the additive is according to Example 1A found in Table 1, above. Results are provided in Table 5.

TABLE 5

Stain Removal results in Front Loader HE machines and Cotton Fabrics

| | ΔSRI | | |
|---|---|---|---|
| Soil | 5A: Detergent Only | 5B: Detergent + Additive | HSD |
| Animal Blood | 68.3 | 60.4 | 20.94 |
| BBQ | 77.3 | 79.3 | 3.78 |
| Black Todd Clay | 54.7 | 55.5 | 5.34 |
| Dyed Bacon | 47.8 | 48.1 | 4.24 |
| Blueberry | 52.8 | 54.5 | 6.78 |
| Burnt Butter | 32.8 | 34.2 | 2.64 |
| Makeup Foundation | 30.4 | 34.4 | 8.30 |
| Cooked Beef | 29.0 | 27.3 | 2.94 |
| Mustard | 32.7 | 33.0 | 3.21 |
| Grape Juice | 48.4 | 54.8 * | 4.42 |
| Grass | 53.7 | 60.2 | 11.68 |
| Gravy | 63.5 | 61.5 | 8.29 |

TABLE 5-continued

Stain Removal results in Front Loader HE machines and Cotton Fabrics

| | ΔSRI | | |
|---|---|---|---|
| Soil | 5A: Detergent Only | 5B: Detergent + Additive | HSD |
| Chocolate Sauce | 61.2 | 64.5 * | 3.06 |
| Tea | 48.2 | 62.6 | 17.30 |
| Coffee | 53.8 | 60.0 | 7.35 |
| Dust Sebum | 25.2 | 24.0 | 2.36 |
| Spaghetti | 28.6 | 31.2 | 6.72 |
| US Clay | 51.0 | 51.1 | 2.98 |
| Red Wine | 41.4 | 46.5 * | 3.39 |
| OVERALL AVERAGE | 47.4 | 49.6 | |

* The ΔSRI values marked with an asterisk (*) are statistically significant compared to the value in the adjacent column.

As shown in Table 5, the regimen treatment (detergent +additive) provided statistically superior cleaning in at least three stains (Grape Juice, Chocolate Sauce, and Red Wine), as well as strong directional removal in others such as Tea, Coffee, and Grass, compared to treatment with only detergent. This demonstrates increased cleaning performance by extending cleaning further into the cycle.

Example 6. Stain Removal (2)-Regimen With Conventional Liquid Detergent

A stain removal test is performed to show the benefits of the presently described additive composition, compared to vinegar, in a regimen context. The vinegar is provided at the maimum volume capacity allowed in the rinse compartment/dispenser of a front-loading HE machine. The Detergent tested is a conventional, commercially available heavy-duty liquid laundry detergent, All™M Free & Clear, which has a pH of about 7.5-8.2. The Additive product is according to Example 1A found in Table 1, above. Table 6-1 shows the testing legs.

TABLE 6-1

| Leg | DETERGENT (Dose) | RINSE (Dose) | TOTAL ACID IN RINSE |
|---|---|---|---|
| 6A (comp.) | All Free & Clear Detergent (47.1 g) | Vinegar (90 mL) | 5.4 mL |
| 6B (inv.) | All Free & Clear Detergent (47.1 g) | Additive (53 mL) | 12.42 mL |

Table 6-2 shows the Stain Removal data for a variety of stains for each test leg.

TABLE 2

Stain Removal results in Front Loader HE machines and Cotton Fabrics

| | 6A | | 6B | | |
|---|---|---|---|---|---|
| Soil | SRI | Sign. | SRI | Sign. | HSD |
| Animal Blood | 86.5 | | 87.6 | | 20.94 |
| BBQ | 78.0 | | 82.4 | ** | 3.78 |
| Black Todd Clay | 54.4 | | 57.5 | | 5.34 |
| Dyed Bacon | 47.2 | | 49.3 | | 4.24 |
| Blueberry | 57.1 | | 61.8 | | 6.78 |
| Burnt Butter | 33.4 | | 34.7 | | 2.64 |
| Make-Up Foundation | 31.4 | | 30.1 | | 8.30 |

TABLE 2-continued

Stain Removal results in Front Loader HE machines and Cotton Fabrics

| | 6A | | 6B | | |
|---|---|---|---|---|---|
| Soil | SRI | Sign. | SRI | Sign. | HSD |
| Cooked Beef | 31.3 | | 31.4 | | 3.91 |
| Mustard | 33.9 | * | 26.5 | | 4.52 |
| Grape Juice | 43.0 | | 59.2 | ** | 4.42 |
| Grass | 53.0 | | 71.4 | ** | 11.68 |
| Gravy | 66.5 | | 71.0 | | 8.29 |
| Chocolate Sauce | 62.6 | | 67.7 | ** | 3.06 |
| Tea | 10.2 | | 46.4 | ** | 17.30 |
| Coffee | 47.3 | | 59.2 | ** | 7.35 |
| Dust Sebum | 46.5 | | 44.9 | | 3.89 |
| Spaghetti | 32.4 | | 37.2 | | 6.72 |
| US Clay | 51.1 | | 51.7 | | 2.98 |
| Red Wine | 39.9 | | 49.4 | ** | 3.39 |
| OVERALL AVG INDEX | 47.7 | | 53.7 | | |

* Indicates statistically significant stain removal compared to the 6B leg, specified at 95% Confidence levels

** Indicates statistically significant stain removal compared to the 6A leg, specified at 95% Confidence levels As demonstrated in Table 6-2, Leg 6B, a regimen that includes 53 mL of an additive composition according to the present disclosure in combination with a conventional liquid detergent, provides superior stain/residue removal compared to a regimen that includes 90mL of Heinz Cleaning Vinegar across multiple stains, several of them being beverage or starch- containing stains.

Example 7. Whitening Benefits (1)-Regimen With Low-pH Detergent

Example 7 demonstrates the statistical and directional whiteness improvement driven by the addition of a liquid laundry additive composition according to the present disclosure in a treatment regimen compared to a low-pH detergent alone.

Calcium soap (or stearates) found in dingy/yellow fabrics are complexation of fats (from body or other residues) and metals (usually from water) held together via Van der walls forces that can oxidize over time in the surfaces of fabrics. This oxidation reaction has been shown to be a cause of yellowing in textiles. Addition of citric acid and surfactant (as in Low pH detergent compositions) can scavenge and chelate metals while helping to emulsify and remove hydrophobic residues. However, addition of citric into the rinse step of the wash process, demonstrated continued dissolution of metals from the fabric surface, can lead to directional or superior calcium soap and dinge removal in fabrics.

In this example, Detergent (53 mL) alone versus a regimen of Detergent (53 mL) and Rinse Additive (53 mL) are tested analyzed. The Detergent is according to Table 2-1, above, and the Rinse Additive is according to Example 1A found in Table 1, above.

More specifically, Whiteness Real Item testing is conducted in North American Top Loader machines, employing consumer white 100% cotton t-shirts (sourced from J&R) across 3 dinge levels (Low Dinge: where WI*CIE >140, Medium Dinge: where WI*CIE>110 but <140, and Heavy Dinge: where WI*CIE<110). A total of 2 Low, 2 Medium, and 2 Heavy T-shirts are selected and cut into squares and heat pressed onto adhesive backing so as to avoid wrinkles/bending. All t-shirt adhered squares are then pre-read for WI*CIE to ensure homogeneity within a t-shirt as specified in the Whiteness Index method provided above. T-shirt squares are then pre-selected within one same t-shirt and split into each laundry treatment, to ensure that all swatches between treatments are as identical in WI*CIE as possible. These squares are then washed in the selected Laundry treatment and post-read for WI*CIE to capture the Before/After Whiteness change per swatch. These results are then averaged by Dinge Level so as to provide Whiteness Recovery grade for each specific laundry treatment. Results for the Medium Dinge levels are shown in Table 7.

TABLE 7

Whiteness change in Medium Dinge Real Items under Illuminate A and D65 Lighting conditions

| TREATMENT | DELTA WHITENESS INDEX *CIE ILLUMINATE A | D65 |
|---|---|---|
| Detergent Alone | 3.6 | 4.1 |
| Regimen: Detergent + Rinse Additive | 6.8* | 6.6 |

*indicates statistically significant difference over Detergent Alone leg

As demonstrated by the results in Table 7, the regimen conditions (which included use of the rinse additive composition) provided directionally and significantly better whiteness performance in Medium Dinge fabrics.

In the other High and Low Dinge levels, in both Illuminate A and D65 conditions, inclusion of the Rinse Additive composition led to directionally higher Whiteness Index versus detergent alone.

Example 8. Whitening Benefits (2)-Regimen With Conventional Detergent

Example 8 shows the whitening benefits of the present additive composition in a regimen with a conventional detergent. Example 8 also shows the whitening benefits of the present additive composition over vinegar. It is believed to be attributable to the chelating and builder (metal scavenging) ability of citric acid which enables the breakdown and solubilization of soap scum (such as calcium stearates) on the surface of fabrics. Removal of such grease-metal complexes is therefore believed to yield improved residue removal, and thus improved whiteness.

The Detergent tested is a conventional, commercially available heavy-duty liquid laundry detergent, AllTM Free & Clear, which has a pH of about 7.5-8.5. The Rinse Additive product is according to Example 1A found in Table 1, above. Table 8 shows the testing legs and results.

TABLE 8

Whiteness change in Medium and Heavy Dinge Real Items under Illuminate A and D65 Lighting conditions

| LEG | TREATMENT DETERGENT (Dose) | RINSE (Dose) | DELTA WHITENESS INDEX *CIE HEAVY DINGE/ ILL. A | MEDIUM DINGE/ ILL. A | HEAVY DINGE/ D65 | MEDIUM DINGE/ D65 |
|---|---|---|---|---|---|---|
| 8A | All Free & Clear Liquid (47.1 g) | None | 6.10 | 4.14 | 9.97 | 4.47 |
| 8B | All Free & Clear Liquid (47.1 g) | Heinz Cleaning Vinegar (90 mL) | 10.37[A] | 3.40 | 12.934 | 3.35 |

TABLE 8-continued

Whiteness change in Medium and Heavy Dinge Real Items under Illuminate A and D65 Lighting conditions

| LEG | TREATMENT DETERGENT (Dose) | RINSE (Dose) | DELTA WHITENESS INDEX *CIE HEAVY DINGE/ ILL. A | MEDIUM DINGE/ ILL. A | HEAVY DINGE/ D65 | MEDIUM DINGE/ D65 |
|---|---|---|---|---|---|---|
| 8C | All Free & Clear Liquid (47.1 g) | Rinse Additive (53 mL) | 11.57[A] | 5.98[A] | 14.02[A] | 6.87[AB] |

A letter next to the Delta Whiteness Index results indicates statistically significant results, where "A" indicates significance over the results of Leg 8A, and where "B" indicates significance over the results of Leg 8B.

As shown by the results in Table 8, the regimen conditions of 8C (which included use of the rinse additive composition in combination with a conventional liquid detergent) provided significantly and/or directionally better whiteness performance on Heavy and Medium Dinge fabrics than the other tested treatments, including the leg (8B) that included vinegar.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid laundry additive composition comprising:

from 12% to 40%, by weight of the composition, of citric acid;

from about 50% to about 95%, by weight of the composition, of water;

the composition being characterized by an acidic pH of from about 2 to about 4;

the composition further comprising perfume and nonionic surfactant; and the composition being substantially free of anionic, cationic, and zwitterionic surfactants;

wherein the composition has a viscosity of about 1 cP to about 200 cP.

2. The composition according to claim 1, wherein the composition is characterized by a Reserve Acidity to pH 4.0 of at least about 1.

3. The composition according to claim 1, wherein the composition comprises from about 20% to about 30%, by weight of the composition, of citric acid.

4. The composition according to claim 1, wherein the composition is characterized by a Reserve Acidity to pH 4.0 of at least about 3.

5. The composition according to claim 1, wherein the liquid laundry additive composition is characterized by a pH of from about 2 to about 3.

6. The composition according to claim 1, wherein the liquid laundry additive composition further comprises an additional organic acid selected from the group consisting of acetic acid, lactic acid, adipic acid, aspartic acid, carboxymethyloxymalonic acid, carboxymethyloxysuccinic acid, glutaric acid, hydroxyethlyliminodiacetic acid, iminodiacetic acid, maleic acid, malic acid, malonic acid, oxydiacetic acid, oxydisuccinic acid, succinic acid, sulfamic acid, tartaric acid, tartaric-discuccinic acid, tartaric-monosuccinic acid, or mixtures thereof.

7. The composition according to claim 1, wherein the liquid laundry additive composition further comprises vinegar.

8. The composition according to claim 1, wherein the liquid laundry additive composition comprises less than 1%, by weight of the composition, of a fabric softening active ("FSA").

9. A method of treating a fabric, said method comprising the steps of:
- combining a liquid laundry additive composition according to claim 1 with water to form a rinse liquor in a vessel;
- contacting a fabric with the rinse liquor in the vessel and agitating the fabric; and
- removing the rinse liquor from the vessel.

10. The method according to claim 9, the method further comprising the steps of:
- combining a laundry detergent composition with water to form a wash liquor in the vessel, wherein the laundry detergent composition comprises anionic surfactant;
- contacting a fabric with the wash liquor in the vessel and agitating said fabric;
- removing the wash liquor from the vessel;
- wherein the step of contacting the fabric with the rinse liquor occurs subsequently to contacting the fabric with the wash liquor.

11. The method according to claim 10, wherein the laundry detergent composition is a liquid laundry detergent that is characterized by an acidic pH.

12. The method according to claim 10, wherein the process further comprises the step of providing the liquid laundry additive composition to a dispenser prior to being provided to the vessel,
- wherein the vessel is the drum of an automatic washing machine, and
- wherein the dispenser is characterized by a receiving volume of from about 25 mL to about 150 mL.

13. The method according to claim 9, wherein the rinse liquor comprises from about 150 to about 1500 ppm of the citric acid.

14. The method according to claim 13, wherein the rinse liquor comprises from about 175 to about 1200 ppm of the citric acid.

15. The method according to claim 13, wherein the rinse liquor is characterized by a pH of from about 2 to about 6.5.

16. The method according to claim 14, wherein the rinse liquor comprises from about 185 to about 1000 ppm of the citric acid.

17. The method according to claim 9, wherein the rinse liquor comprises less than about 500 ppm of anionic surfactant.

18. The composition of claim 1, wherein the composition has a viscosity of about 1 cP to about 150 cP.

19. A liquid laundry additive composition comprising:
- from 18% to 40%, by weight of the composition, of citric acid;
- from about 50% to about 95%, by weight of the composition, of water;
- the composition being characterized by an acidic pH of from about 2 to about 4 ;
- the composition further comprising perfume and nonionic surfactant;
- the composition being substantially free of inorganic acid; and
- the composition being substantially free of anionic, cationic, and zwitterionic surfactants.

* * * * *